United States Patent
Endo (10) Patent No.: US 6,574,557 B2
(45) Date of Patent: Jun. 3, 2003

(54) POSITIONING ERROR RANGE SETTING APPARATUS, METHOD, AND NAVIGATION APPARATUS

(75) Inventor: Isao Endo, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/132,568

(22) Filed: Apr. 26, 2002

(65) Prior Publication Data

US 2002/0161523 A1 Oct. 31, 2002

(30) Foreign Application Priority Data

Apr. 27, 2001 (JP) .................................... 2001-133056

(51) Int. Cl.⁷ ............................................. G01C 21/00
(52) U.S. Cl. .................. 701/213; 701/214; 342/357.12; 342/357.08; 342/357.06
(58) Field of Search ................................. 701/213, 214, 701/215; 342/357.12, 357.08, 357.06, 357.03

(56) References Cited

U.S. PATENT DOCUMENTS 6,272,430 B1 * 8/2001 Krasner ...................... 701/207
6,433,734 B1 * 8/2002 Krasner .................. 342/357.09

* cited by examiner

Primary Examiner—William A Cuchlinski, Jr.
Assistant Examiner—Marthe Y. Marc-Coleman
(74) Attorney, Agent, or Firm—Sughrue Mion, PLLC (57) ABSTRACT

A navigation apparatus includes: a multi-path detection unit which detects multi-path based on a pseudo-range; a pseudo-range error selection unit which selects an error in the pseudo-range based on the detected multi-path and navigation data; and an error ellipse calculation unit which calculates an error ellipse based on the pseudo-range error selected by the pseudo-range error selection unit and the received navigation data, and executes navigation processing based on a vehicle's own current position calculated by a positioning calculation unit and the error ellipse calculated by the error ellipse calculation unit.

22 Claims, 5 Drawing Sheets

TRAJECTORY OF VEHICLE

◀ POINT a: VEHICLE'S OWN POSITION
◁ POINT b: POSITIONING RESULT OBTAINED FROM GPS SIGNAL
◁ POINT c: VEHICLE'S OWN POSITION

FIG. 5

TRAJECTORY OF VEHICLE

◀ POINT d: POSITION POSITIONED BY SELF-CONTAINED NAVIGATION
◁ POINT e: POSITIONING RESULT OBTAINED BY GPS
◁ POINT f: POSITIONING RESULT OBTAINED BY GPS WHEN MULTI-PATH IS GENERATED

POSITIONING ERROR RANGE SETTING APPARATUS, METHOD, AND NAVIGATION APPARATUS

BACKGROUND OF THE INVENTION

1. Field of the Invention

The present invention relates to a technical field of a navigation apparatus, and more particularly to a technical field of an apparatus for evaluating positioning data obtained by GPS navigation.

2. Description of the Related Art

In navigation apparatuses, as one of techniques for following up a vehicle or the like by detecting its current position, a positioning method which obtains a position of a vehicle based on a satellite signal (GPS signal) transmitted from a GPS (Global Positioning System) satellite has been generally widespread (which will be referred to as GPS navigation hereinafter).

The accuracy of a position obtained by positioning calculation in the GPS navigation is determined by the satellite arrangement of satellites (basically, not less than four) which transmit GPS signals and the measurement accuracy of a distance from a vehicle, which has received the GPS signals, to each GPS satellite (which will be referred to as a pseudo-range hereinafter).

Further, in recent years, there has been adopted a method which carries out map matching with a map data base by using both the GPS navigation and dead-reckoning which obtains a traveling trajectory by using a gyro sensor and a vehicle speed sensor (which will be simply referred to as dead-reckoning hereinafter).

In such a technique, in case of using a positioning result actually obtained by the GPS navigation in a car navigation apparatus, when a vehicle's own position obtained by the dead-reckoning or map matching largely deviates from a positioning result obtained by the GPS for example, the vehicle's own position is reset to a position of this positioning result, or this result is utilized for selecting a matching position candidate used in map matching.

On the other hand, since the positioning result actually obtained by the GPS navigation includes an error of, e.g., the system or arrangement of the GPS satellites, an error in the positioning result must be taken into consideration in order to use the result positioned by the GPS signal for evaluation of the vehicle's own position.

More specifically, for example, there is a method which uses an error coefficient called a DOP (Dilution of Precision) value determined by arrangement of the GPS satellites and enables the positioning result obtained by the GPS navigation. This method enables the positioning result obtained by the GPS navigation only when the DOP value in the received GPS signal is equal to or below a fixed value.

When a distance to a satellite observed in sole positioning of each GPS satellite includes an error at a fixed level, this DOP value is an index value used for estimating how this error affects the positioning result. As typical DOP values, there are a DOP (HDOP) value in the horizontal direction, a DOP (VDOP) value in the vertical direction and a DOP (PDOP) value in the horizontal/vertical directions.

Furthermore, there is a method which calculates a range in which a vehicle may possibly exist (positioning error range (which will be simply referred to as an error range hereunder)) based on the DOP value and evaluates the inside of this range as a correct position of the vehicle.

In this method, a radius of a circle is obtained by a product of the DOP value and a measurement error in a pseudo-range in each of a plurality of satellites, i.e., (Expression 1), and the vehicle's own position is evaluated with an area in the circle (which will be referred to as an error distribution circle hereinafter) range generated by the radius being determined as a range in which the vehicle may exists.

$$\text{Error distribution circuit (radius)} = HDOP \times \text{Measurement error of pseudo-range} \quad (1)$$

It is to be noted that a maximum value in the measurement errors of a plurality of obtained pseudo-ranges or a mean value of the measurement errors of the respective pseudo-ranges is used as the measurement error of the pseudo-range used for calculation in this method.

On the other hand, there is a method which obtains the error range determined by the GPS satellite arrangement by calculating a probability error ellipse (which will be referred to as an error ellipse hereinafter) without using the DOP value.

According to the method using the error ellipse, an error ellipse which is an error range is calculated based on the arrangement of the GPS satellites used for positioning and a pseudo-range error in each GPS satellite, and the vehicle's own position is evaluated as an area that the vehicle may exists in any range in the error ellipse.

This error ellipse shows the distribution of the position error which two-dimensionally distributes when components of the position error in a positioning result in the latitudinal direction and the longitudinal direction normally distribute. Specifically, calculation is carried out by using a standard deviation of an error in the latitudinal direction, a standard deviation of an error in the longitudinal direction and the correlation function of the respective standard deviations. Moreover, as represented by Expression (2), in regard to the error ellipse actually used for accuracy evaluation, an ellipse (true error ellipse) is calculated by multiplying the error ellipse calculated as described above by the measurement error of the pseudo-range in the actual GPS satellite.

$$\text{Error ellipse (true)} = \text{Error ellipse (for example, an error is assumed as 1 m)} \times \text{Measurement Error of Pseudo-range} \quad (2)$$

Incidentally, assuming that measurement errors of distances to all the satellites are constant (for example, 1 m), the shape of ellipse (long axis, short axis, inclination) can be readily calculated.

In addition, the error ellipse presumed to be 1 m is a reference error ellipse generated by assuming that the pseudo-range error in each GPS signal is 1 m. The true range of the error ellipse can be, therefore, represented by multiplying the error ellipse presumed to be 1 m by the measurement error of the pseudo-range in the GPS signal.

It is often the case that a value obtained by adding an accuracy value of the pseudo-range error broadcasted from each satellite (which will be referred to as UERE (User Equivalent Range Error)) and the measurement error caused due to noise generated in the GPS receiver is used as the error value of the pseudo-range of the satellite. The validity of the vehicle's own position can be judged based on the relationship between the ellipse and the vehicle's own position.

In case of the method using the above-described DOP value, however, the error distribution actually outputted by the GPS receiver becomes an ellipse instead of a circle because of the arrangement of the GPS satellites used for positioning, and hence there is a problem that the vehicle's own position can not be correctly evaluated (when the ellipse becomes oblong in particular).

Figure 4:
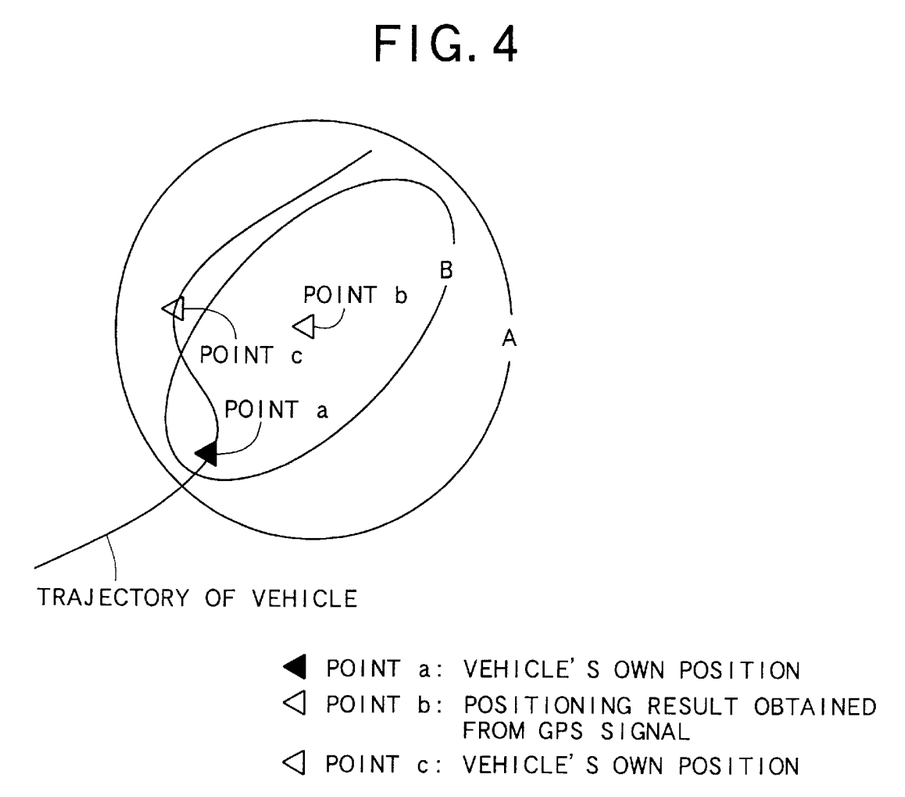
FIG. 4 is a view for illustrating the principle of calculating an error distribution for evaluating a positioning result in a prior art navigation apparatus.

For example, as shown in FIG. 4, assuming that the vehicle's own position calculated by the dead-reckoning is a point a and a positioning result positioned based on the GPS signal is a point b, since the point a is included in both the error distribution circle A obtained by the DOP value generated based on the point b of the positioning result and the error ellipse B obtained by the arrangement of the GPS satellites generated based on the point b of the positioning result, an error is not produced in an evaluation result of the vehicle's own position. However, when the vehicle's own position is a point c for example, the point b of the evaluation result differs. That is, although the vehicle's own position is evaluated as inappropriate in the error ellipse representing the further accurate error range, it is determined as appropriate in the error distribution circle.

Additionally, in the method using the error ellipse mentioned above, there is not included the measurement error in the pseudo-range which inherently occurs depending on a position of each GPS receiver such as multi-path. Therefore, in a place where the large multi-path occurs during traveling in a urban district or the like, matching between the accuracy indicated by the error ellipse, i.e., the error range obtained by the calculation of Expression (2) and the actually generated error range can not be achieved, and evaluation of the vehicle's own position can not be appropriately carried out.

Figure 5:
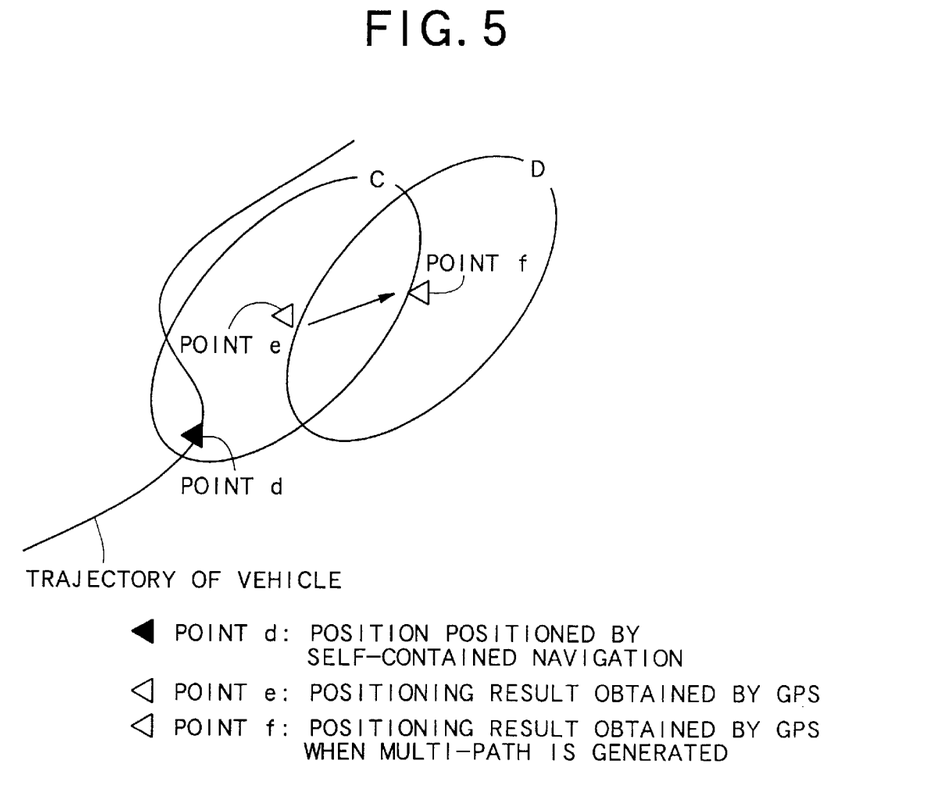
FIG. 5 is a view illustrating the principle of calculating an error ellipse for evaluating a positioning result in the prior art navigation apparatus.

For example, as shown in FIG. 5, assuming that a position at which the vehicle's own position obtained by the dead-reckoning or the like and the true vehicle's own position are matched is a point d and a positioning result positioned based on the GPS signal without occurrence of the multi-path is a point e, the point d exists in an error ellipse C generated with the point e as a reference, and hence the point d is evaluated as being appropriate as the vehicle's own position, which does not lead to a problem. However, the multi-path occurs due to reflection by an obstacle when receiving the GPS signal, the positioning result obtained from the GPS signal is shifted from the point e to, e.g., a point f due to occurrence of the multi-path. At this moment, since the influence of occurrence of the multi-path is not reflected to Expression (2), the size of an error ellipse D is still the same as that of the error ellipse C. Thus, the point d of the vehicle's own position obtained by the dead-reckoning or the like is judged as inappropriate.

As a countermeasure when the multi-path occurs, although a method which estimates the pseudo-range as being larger than a regularly calculated value can be considered, this results in constant enlargement of the error ellipse, thereby leading to a different problem that the reliability of evaluation of the vehicle's own position is lowered.

SUMMARY OF THE INVENTION

In view of the above-described problems, it is an object of the present invention to provide an error range judging apparatus capable of correctly evaluating a positioning result even if a pseudo-error which inherently occurs depending on a position of a GPS receiver, and a navigation apparatus utilizing this apparatus.

The above object of the present invention can be achieved by a positioning error range setting apparatus of the present invention. The apparatus is provided with: a calculating device for calculating a geographical position of a receiver by calculating a pseudo-range between said receiver and each of a plurality of transmitters based on a positioning signal transmitted from each of a plurality of said transmitters; a detecting device for detecting whether each said positioning signal is a signal received with occurrence of multi-path; and a determining device for determining a positioning error range of said geographical position based on arrangement of a plurality of said transmitters, a positioning error generated when calculating said pseudo-range and a detection result in said detecting device.

According to the present invention, a calculating device calculates a geographical position of a receiver by calculating a pseudo-range between the receiver and each of a plurality of transmitters based on positioning signals transmitted from a plurality of the transmitters, s detecting device detects whether each positioning signal is a signal received with occurrence of multi-path, and a determining device determines a positioning error range of the geographical position based on arrangement of a plurality of the transmitters, a positioning error generated when calculating the pseudo-range and a detection result of the detecting device.

Therefore, since the positioning error range of the geographical position can be calculated based on arrangement of a plurality of the transmitters, the positioning error generated when calculating the pseudo-range and the detection result of multi-path, an appropriate positioning error range can be obtained taking the influence of the multi-path into consideration even if the multi-path occurs when receiving the positioning signals.

In one aspect of the present invention, the positioning error is acquired based on accuracy information of said pseudo-range that the positioning signal has.

According to this aspect, the accuracy of the calculated pseudo-range can be reflected to the positioning error range, the appropriate positioning error range can be calculated.

In another aspect of the present invention, the detecting device detects an error in the pseudo-range of a positioning signal received with occurrence of multi-path and calculates the positioning error based on said error in the pseudo-range.

According to this aspect, the detecting device detects an error in the pseudo-range of the positioning signal received with occurrence of multi-path and calculates a positioning error based on the error in the pseudo-range.

Therefore, since the positioning error range of the geographical position in the receiver can be calculated based on the error in the pseudo-range generated due to the multi-path even if the multi-path is detected when receiving the positioning signal, the influence of the multi-path can be reflected to the positioning error range, thereby obtaining the appropriate positioning error range.

In further aspect of the present invention, the error in the pseudo-range of the positioning signal received with occurrence of multi-path is compared with a value obtained by using the accuracy information of the pseudo-range that the positioning signal has, and the larger value in comparison is determined as the positioning error.

According to this aspect, an error the a pseudo-range of the positioning signal received with occurrence of multi-path is compared with a value obtained by using accuracy information of the pseudo-range of the positioning signal, and the value which is larger in comparison is determined as a positioning error.

Therefore, when the multi-path is detected when receiving the positioning signal, the influence of the multi-path can be reflected to the positioning error range. Further, when it is not detected, the accuracy of the calculated pseudo-range can be reflected to the positioning error range, thereby obtaining the appropriate positioning error range.

In further aspect of the present invention, the positioning error is calculated based on the error in the pseudo-range of the positioning signal received with occurrence of multi-path and the value obtained by using the accuracy information of the pseudo-range that the positioning signal has.

According to this aspect, the positioning error is calculated based on an error in the pseudo-range of the positioning signal received with occurrence of multi-path and accuracy information of the pseudo-range that the positioning signal has.

Therefore, the accuracy of the calculated pseudo-range can be reflected to the positioning error range, and the influence of the multi-path can be reflected to the positioning error range when the multi-path is detected, thereby calculating the appropriate positioning error range.

In further aspect of the present invention, the error in the pseudo-range of the positioning signal received with occurrence of multi-path is generated based on a differential value between a predicted value predicted by using an already calculated pseudo-range and the pseudo-range calculated by the calculating device.

According to this aspect, an error in the pseudo-range of the positioning signal received with occurrence of multi-path is generated based on a differential value between a predicted value which is predicted from the already calculated pseudo-range and the pseudo-range calculated by the calculating device.

Accordingly, the accuracy of the error in the pseudo-range generated due to the multi-path can be improved, and the positioning error range calculated when the multi-path is detected can be appropriately obtained.

In further aspect of the present invention, the differential value is less than a predetermined reference value, the value obtained by using the accuracy information is determined as the positioning error.

According to this aspect, when the differential value is less than a predetermined reference value, a value obtained by accuracy information is determined as a positioning error.

Therefore, when the error in the pseudo-range generated due to the multi-path is smaller than a value obtained by using the accuracy information in the positioning signal, the positioning error range can be calculated by using the accuracy information that the positioning signal has, and hence the positioning error range can be appropriately calculated when the multi-path is accidentally detected.

The above object of the present invention can be achieved by a navigation apparatus of the present invention. The apparatus is provided with: a positioning error range setting device comprising: a calculating device for calculating a geographical position of a receiver by calculating a pseudo-range between said receiver and each of a plurality of transmitters based on a positioning signal transmitted from each of a plurality of said transmitters; a detecting device for detecting whether each said positioning signal is a signal received with occurrence of multi-path; and a determining device for determining a positioning error range of said geographical position based on arrangement of a plurality of said transmitters, a positioning error generated when calculating said pseudo-range and a detection result in said detecting device; and an evaluating device for evaluating a position of a movable body positioned by dead-reckoning based on a geographical position of said receiver estimated based on said positioning signal and said positioning error range calculated by said positioning error range setting device.

According to this invention, a position of a movable body positioned by dead-reckoning is evaluated based on a geographical position of a receiver estimated based on a positioning signal and a positioning error range calculated by a positioning error range setting apparatus.

Thus, a position of a movable body positioned by dead-reckoning can be evaluated based on a positioning error range to which the influence of multi-path is reflected, thereby improving the position accuracy in navigation.

The above object of the present invention can be achieved by a positioning error range setting method of the present invention. The method is provided with: a calculation process of calculating a geographical position of a receiver by calculating a pseudo-range between said receiver and each of a plurality of transmitters based on a positioning signal transmitted from each of a plurality of said transmitters; a detection process of detecting whether each said positioning signal is a signal received with occurrence of multi-path; and a determination process of determining a positioning error range of said geographical position based on arrangement of a plurality of said transmitters, a positioning error generated when calculating said pseudo-range and a detection result in said detection process.

According to the present invention, a calculation step calculates a geographical position of a receiver by calculating a pseudo-range between the receiver and each of a plurality of transmitters based on positioning signals outputted from a plurality of the transmitters, a detection process detects whether each positioning signal is a signal received with occurrence of multi-path, and a determination process determines a positioning error range of the geographical position based on arrangement of a plurality of the transmitters, a positioning error generated when calculating the pseudo-range and a detection result in the detection process.

Therefore, since the positioning error range of the geographical position can be calculated based on arrangement of a plurality of transmitters, the positioning error generated when calculating the pseudo-range and the detection result of multi-path, the appropriate positioning error range can be calculated taking the influence of the multi-path into consideration even if the multi-path occurs when receiving the positioning signals.

In one aspect of the present information, the positioning error is acquired based on accuracy information of the pseudo-range that said positioning signal has.

According to this aspect, the positioning error is obtained based on accuracy information of the pseudo-range that the positioning signal has.

Accordingly, the accuracy of the calculated pseudo-range can be reflected to the positioning error range, thereby calculating the appropriate positioning error range.

In another aspect of the present invention, a detection process detects an error in the pseudo-range of a positioning signal received with occurrence of multi-path, and calculates said positioning error based on the error in the pseudo-range.

According to this aspect, the detection process detects an error in the pseudo-range of the positioning signal received with occurrence of multi-path, and calculates a positioning error based on the error in the pseudo-range.

Therefore, since the positioning error range of the geographical position in the receiver can be calculated based on the error in the pseudo-range generated due to the multi-path even if the multi-path is detected when receiving the positioning signal, the influence of the multi-path can be reflected to the positioning error range, and the appropriate positioning error range can be calculated.

In further aspect of the present invention, the error in the pseudo-range of the positioning signal received with occurrence of multi-path is compared with a value obtained by using the accuracy information of the pseudo-range that the positioning signal has, and the larger value in comparison is determined as the positioning error.

According to this aspect, the error in the pseudo-range of the positioning signal received after occurrence of the multi-path is compared with a value obtained by using accuracy information of the pseudo-range that the positioning signal has, and the value larger in comparison is determined as the positioning error.

Thus, if the multi-path is detected when receiving the positioning signal, the influence of the multi-path can be reflected to the positioning error range. If it is not detected, the accuracy of the calculated pseudo-range can be reflected to the positioning error range, thereby calculating the appropriate positioning error range.

In further aspect of the present invention, the positioning error is calculated based on the error in the pseudo-range of the positioning signal received with occurrence of multi-path and the value obtained by using the accuracy information of the pseudo-range that the positioning signal has.

According to this aspect, the positioning error is calculated based on the error in the pseudo-range of the positioning signal received with occurrence of the multi-path and the value obtained by using the accuracy information of the pseudo-range that the positioning signal has.

Accordingly, the accuracy of the calculated pseudo-range can be reflected to the positioning error range, and the influence of the multi-path can be reflected to the positioning error range when the multi-path is detected, thereby calculating the appropriate positioning error range.

In further aspect of the present invention, the error in the pseudo-range of the positioning signal received with occurrence of multi-path is generated based on a differential value between a predicted value predicted by using an already calculated pseudo-range and the pseudo-range calculated by the calculating process.

According to this aspect, the error in the pseudo-range in the positioning signal received with occurrence of the multi-path is generated based on a differential value between a predicted value which is predicted by the already calculated pseudo-range and a pseudo-range calculated by calculating device.

Therefore, the accuracy of the error in the pseudo-range generated due to the multi-path can be improved, and the positioning error range calculated when the multi-path is detected can be appropriately calculated.

In further aspect of the present invention, when the differential value is less than a predetermined reference value, the value obtained by using the accuracy information is determined as the positioning error.

According to this aspect, when the differential value is less than a predetermined reference value, the value obtained by using the accuracy information is determined as the positioning error.

Accordingly, when the error in the pseudo-range caused due to the multi-path is smaller than the value obtained by using the accuracy information in the positioning signal, the positioning error range can be calculated by using the accuracy information that the positioning signal has, and hence the positioning error range can be appropriately calculated when the multi-path is accidentally detected.

The above object of the present invention can be achieved by a positioning error range setting processing program embodied on a computer-readable medium of the present invention. The program causes a computer to function as: a calculating device for calculating a geographical position of a receiver by calculating a pseudo-range between said receiver and each of a plurality of transmitters based on a positioning signal transmitted from each of a plurality of said transmitters; a detecting device for detecting whether each said positioning signal is a signal received with occurrence of multi-path; and a determining device for determining a positioning error range of said geographical position based on arrangement of a plurality of said transmitters, a positioning error generated when calculating said pseudo-range and a detection result of said detecting device.

According to the present invention, a computer calculates a geographical position of a receiver by calculating a pseudo-range between the receiver and each of a plurality of transmitters based on positioning signals transmitted from a plurality of the transmitters, detects whether each positioning signal is a signal received with occurrence of multi-path, and determines a positioning error range of the geographical position based on a positioning error generated when calculating the pseudo-range and a detection result of the detecting device.

Therefore, since a positioning error range of the geographical position can be calculated based on arrangement of a plurality of the transmitters, the positioning error generated when calculating the pseudo-range and the detection result of the multi-path, the appropriate positioning error range can be calculated taking the influence of the multi-path into consideration even if the multi-path occurs when receiving the positioning signals.

In one aspect of the present invention, the computer is caused to function so as to obtain the positioning error based on accuracy information of said pseudo-range that said positioning signal has.

According to this aspect, the computer obtains the positioning error based on accuracy information of the pseudo-range that the positioning signal has.

Accordingly, the accuracy of the calculated pseudo-range can be reflected to the positioning error range, thereby calculating the appropriate positioning error range.

In another aspect of the present invention, the computer is caused to function as the detecting device for detecting an error in said pseudo-range of the positioning signal received with occurrence of multi-path, and calculating the positioning error based on the error in the pseudo-range.

According to this aspect, the computer detects an error in the pseudo-range of the positioning signal received with occurrence of the multi-path, and calculates the positioning error based on the error in the pseudo-range.

Thus, since the positioning error range of the geographical position in the receiver can be calculated based on the error in the pseudo-range caused due to the multi-path even if the multi-path is detected when receiving the positioning signal, the influence of the multi-path can be reflected to the positioning error range, thereby calculating the appropriate positioning error range.

In further aspect of the present invention, the computer is caused to compare the error in said pseudo-range of the positioning signal received with occurrence of multi-path with a value obtained by using accuracy information of the pseudo-range that the positioning signal has, and determine the larger value in comparison as the positioning error.

According to this aspect, the computer compares the error in the pseudo-range of the positioning signal received with occurrence of the multi-path with a value obtained by using accuracy information of the pseudo-range that the positioning signal has, and determines the value which is larger in comparison as the positioning error.

Therefore, if the multi-path is detected when receiving the positioning signal, the influence of the multi-path can be reflected to the positioning error range. If it is not detected, the accuracy of the calculated pseudo-range can be reflected to the positioning error range, thereby calculating the appropriate positioning error range.

In further aspect of the present invention, the computer is caused to calculate the positioning error based on the error in the pseudo-range of the positioning signal received with occurrence of multi-path and a value obtained by using the accuracy information of the pseudo-range that the positioning signal has.

According to this aspect, the computer calculates the positioning error based on the error in the pseudo-range of the positioning signal received with occurrence of the multi-path and a value obtained by using accuracy information of the pseudo-range that the positioning signal has.

Accordingly, the accuracy of the calculated pseudo-range can be reflected to the positioning error range, and the influence of the multi-path can be reflected to the positioning error range when the multi-path is detected, thereby calculating the appropriate positioning error range.

In further aspect of the present invention, the computer is caused to generate the error in the pseudo-range of the positioning signal received with occurrence of multi-path based on a differential value between a predicted value predicted by using an already calculated pseudo-range and the pseudo-range calculated by the calculating device.

According to this aspect, the computer generates the error in the pseudo-range of the positioning signal received with occurrence of the multi-path based on a differential value between a predicted value which is predicted by the already calculated pseudo-range and a pseudo-range calculated by the calculating device.

Thus, the accuracy of the error in the pseudo-range caused due to the multi-path can be improved, and the positioning error range calculated when the multi-path is detected can be appropriately obtained.

In further aspect of the present invention, the computer is caused to determine the value obtained by using the accuracy information as the positioning error when the differential value is less than a predetermined reference value.

According to this aspect, when a differential value is less than a predetermined reference value, the computer determines the value obtained by using the accuracy information as the positioning error.

Therefore, when the error in the pseudo-range caused due to the multi-path is smaller than the value obtained by using the accuracy information in the positioning signal, the positioning error range can be calculated by using the accuracy information that the positioning signal has, and hence the positioning error range can be appropriately calculated when the multi-path is accidentally detected.

DETAILED DESCRIPTION OF THE PREFERRED EMBODIMENT

A preferred embodiment according to the present invention will now be described hereinafter with reference to the accompanying drawings. Incidentally, the following embodiment is the case that the present invention is applied to an in-vehicle navigation apparatus (which will be simply referred to as a navigation apparatus hereunder).

The entire structure of the navigation apparatus according to this embodiment will be first described with reference to FIGS. 1 and 2.

Figure 1:
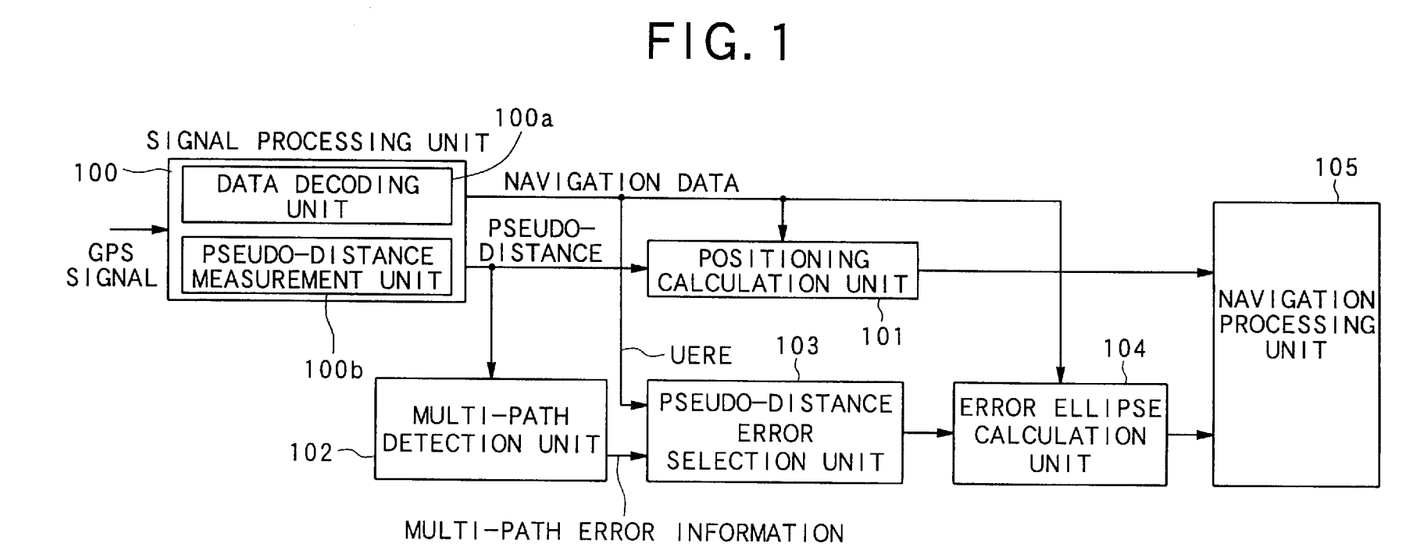
FIG. 1 is a block diagram showing a structure of an embodiment of a positioning error ellipse setting apparatus, a positioning error ellipse setting method, a positioning error ellipse setting processing program and a navigation apparatus.
Figure 2:
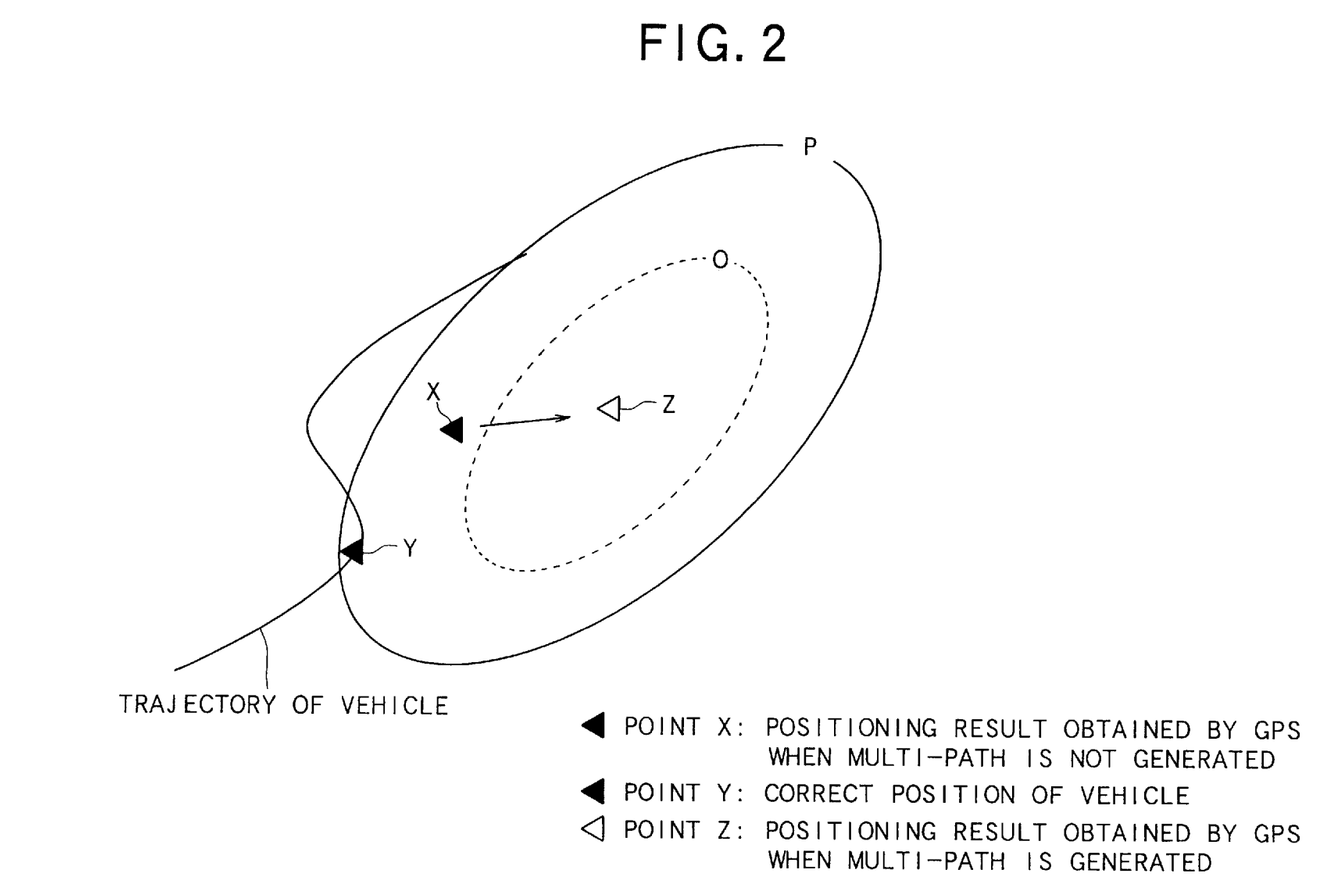
FIG. 2 is a view illustrating the principle of calculating an error ellipse for evaluating a positioning result in the embodiment when multi-path is detected.

It is to be noted that FIG. 1 is a block diagram showing a schematic structure of the navigation apparatus according to this embodiment and FIG. 2 is a view illustrating an evaluation method in an error ellipse when multi-path occurs.

As shown in FIG. 1, the navigation apparatus S according to this embodiment is comprised of: a signal processing unit 100 which executes signal processing of GPS signals received by a non-illustrated reception unit and obtains navigation data and a pseudo-range to each GPS satellite; a positioning calculation unit 101 which calculates a vehicle's own current position based on the navigation data and respective pseudo-ranges; a multi-path detection unit 102 which detects multi-path based on each pseudo-range; a pseudo-range error selection unit 103 which sets a positioning error value of the pseudo-range based on a result of detecting the multi-path and the navigation data; an error ellipse calculation portion 104 which calculates an error ellipse based on the pseudo-range error and the navigation data; and a navigation processing unit 105 which evaluates the vehicle's own position based on the vehicle's own current position calculated by the positioning calculation unit 101 and the error ellipse calculated by the error ellipse calculation unit 104.

It is to be noted that the signal processing unit 100 and the positioning calculation unit 101 is served as a calculating device according to the present invention and the multi-path detection unit 102 is served as a detecting device according to the present invention. Further, the pseudo-range error selection unit 103 and the error ellipse calculation unit 104 are served as a determining device according to the present invention.

The signal processing unit 100 has a data decoding unit 100a which acquires navigation data from respective GPS signals received by the non-illustrated reception unit and broadcasted from a plurality of satellites, and a pseudo-range measurement unit 100b which measures a distance error to each GPS satellite.

The data decoding unit 100a is configured to acquire the navigation data required for the positioning calculation of the vehicle based on the signals received by the non-illustrated reception unit and broadcasted from the respective GPS satellites, and output the acquired navigation data for each GPS satellite to the positioning calculation unit 101 and the error ellipse calculation unit 104.

The pseudo-range measurement unit 100b is configured to acquire an arrival time of a signal received by the non-illustrated reception unit and broadcasted from each GPS satellite, and calculate a value of a distance from the vehicle to each GPS satellite (which will be referred to as a pseudo-range value hereunder) and output the pseudo-range value to the positioning calculation unit 101 and the multi-path detection unit 102.

To the positioning calculation unit 101 are inputted the navigation data for each GPS satellite acquired by the data decoding unit 100a and the pseudo-range value for each GPS satellite calculated by the pseudo-range measurement unit 100b, and the positioning calculation unit 101 calculates the vehicle's own current position based on the navigation data and the pseudo-range value inputted thereto. Furthermore, the positioning calculation unit 101 outputs information of the calculated current position of the vehicle to the navigation processing unit 105.

To the multi-path detection unit 102 is inputted the pseudo-range value for each GPS satellite calculated by the pseudo-range measurement unit 100b, and the multi-path detection unit 102 makes judgment upon whether each signal received by the non-illustrated GPS reception portion is affected by multi-path based on each pseudo-range value inputted thereto.

For example, the multi-path is detected by utilizing the fact that the pseudo-range continuously changes in some measure. Specifically, a predicted value of the current pseudo-range for each GPS satellite is calculated in advance based on a result of previous positioning or the pseudo-range value for each GPS satellite used when carrying out previous positioning. Then, the predicted value is compared with the pseudo-range value for each GPS satellite to obtain a difference, and it is determined that the multi-path is generated when the difference is judged as above a predetermined reference value.

Moreover, the multi-path detection unit 102 is configured to calculate the influence including the multi-path as, e.g., an error value (which will be referred to as multi-path error information hereinafter) when determined that the multi-path is generated, and output the calculated multi-path error information to the pseudo-range error selection unit 103. It is to be noted that the above-described difference can be applied to the multi-path error information.

To the pseudo-range error selection unit 103 are inputted a multi-path detection result outputted from the multi-path detection unit 102 and the multi-path error information when the multi-path is detected as well as the UERE outputted from the data decoding unit 100a. When it is determined that the multi-path is generated based on a detection result in the multi-path detection unit 102, the pseudo-range error selection unit 103 sets a measurement error value of the pseudo-range based on the multi-path error information and the UERE and outputs it to the error ellipse calculation unit 104.

For example, the multi-path error information inputted from the multi-path detection unit 102 can be compared with the UERE in the GPS signal with which the multi-path is determined as produced so that the larger value can be outputted to the error ellipse calculation unit 104 as a pseudo-range error. Alternatively, the multi-path error information can be outputted as the pseudo-range error value. In addition, the pseudo-range value is not determined by using only the GPS signal with which the multi-path is determined as being generated, but it can be calculated based on a square root of an average value of square-sums of the pseudo-range error values in the respective GPS signals, or it can be determined as a maximum value in the pseudo-range error values in the respective GPS signal.

To the error ellipse calculation unit 104 are inputted the navigation data in each GPS signal outputted from the data decoding unit 100a and the error value of the pseudo-range set by the pseudo-range error selection unit 103, and the error ellipse calculation unit 104 calculates an error ellipse by using the above-described Expression (2). That is, the size of the error ellipse is determined by multiplying the error ellipse obtained when the error calculated using the inputted navigation data is 1 m by the error value of the pseudo-range outputted from the pseudo-range error selection unit 103.

For example, when a signal indicating that the error of the pseudo-range is 50 m is supplied from the pseudo-range error selection unit 103, the error ellipse is calculated with the measurement error of the pseudo-range in Expression (2) being determined as 50 m.

As a result, as shown in FIG. 2, assuming that a positioning result in the GPS signal when the multi-path is not generated is a point X, the vehicle's position obtained by dead-reckoning or map matching and a correct position of the vehicle are the same point Y and a positioning result in the GPS signal when it is determined that the multi-path is generated is a point Z, evaluation of the point of the vehicle's own position is an error in the regular error ellipse O. However, calculating the error ellipse by using the above-described calculation method, the ellipse becomes large when the multi-path occurs, and the vehicle's own position Y is included in the range of the error ellipse P. Therefore, the vehicle's own position which is appropriate is not evaluated as improper.

It is to be noted that this evaluation is executed by the navigation processing unit 105 and the error ellipse calculation portion 104 only calculates the error ellipse in this embodiment.

To the navigation processing unit 105 are inputted a positioning result of the vehicle in the GPS signal calculated by the positioning calculation unit 101 and the error ellipse calculated by the error ellipse calculation unit 104, and the navigation apparatus 105 evaluates the vehicle's own position (calculated by, e.g., dead-reckoning) based on the inputted error ellipse.

As a result, it is possible to maintain the high reliability of the processing which resets the vehicle's own position to a position of the positioning result when the vehicle's own position obtained by dead-reckoning or map matching largely deviates from the error ellipse or checks off a candidate spot of the vehicle's own position which does not exist in the error range from the target of map matching without depending on occurrence of multi-path.

According to the above-described embodiment, since the error ellipse which is set based on arrangement of the GPS satellites when the respective GPS signals are received by the signal processing unit 100 and the accuracy (UERE) of the pseudo-range in each of the received positioning signals can be modified based on the multi-path error information when multi-path is detected, the influence of multi-path can be reflected to the error ellipse.

Therefore, even when this multi-path is detected, the vehicle's own position calculated by dead-reckoning can be appropriately evaluated, thereby improving the position accuracy of the vehicle's own position which is shown to a user.

Incidentally, although this embodiment generates the error ellipse based on the GPS signals in the navigation apparatus installed in a vehicle and evaluates the vehicle's position obtained by dead-reckoning, the error ellipse may be generated by using electric waves for communication in a portable terminal device such as a mobile phone so that a position determined by the electric waves can be evaluated.

In this case, a plurality of electric waves used for communication between the mobile phone and a base station provided at an arbitrary position are received by the mobile phone, and an error generated when positioning (corresponding to the UERE) is previously calculated. The error ellipse is thereby created based on the communication electric waves received by the mobile phone, and a position of the mobile phone is evaluated by using this error ellipse.

Additionally, in case of calculating the error ellipse by using software, a computer executing this program (controlling device) is provided in place of the signal processing unit 100, the multi-path detection unit 102, the pseudo-range error selection unit 103 and the error ellipse calculation unit 104. The operation for setting the error ellipse will now be described hereinafter with reference to FIG. 3.

Figure 3:
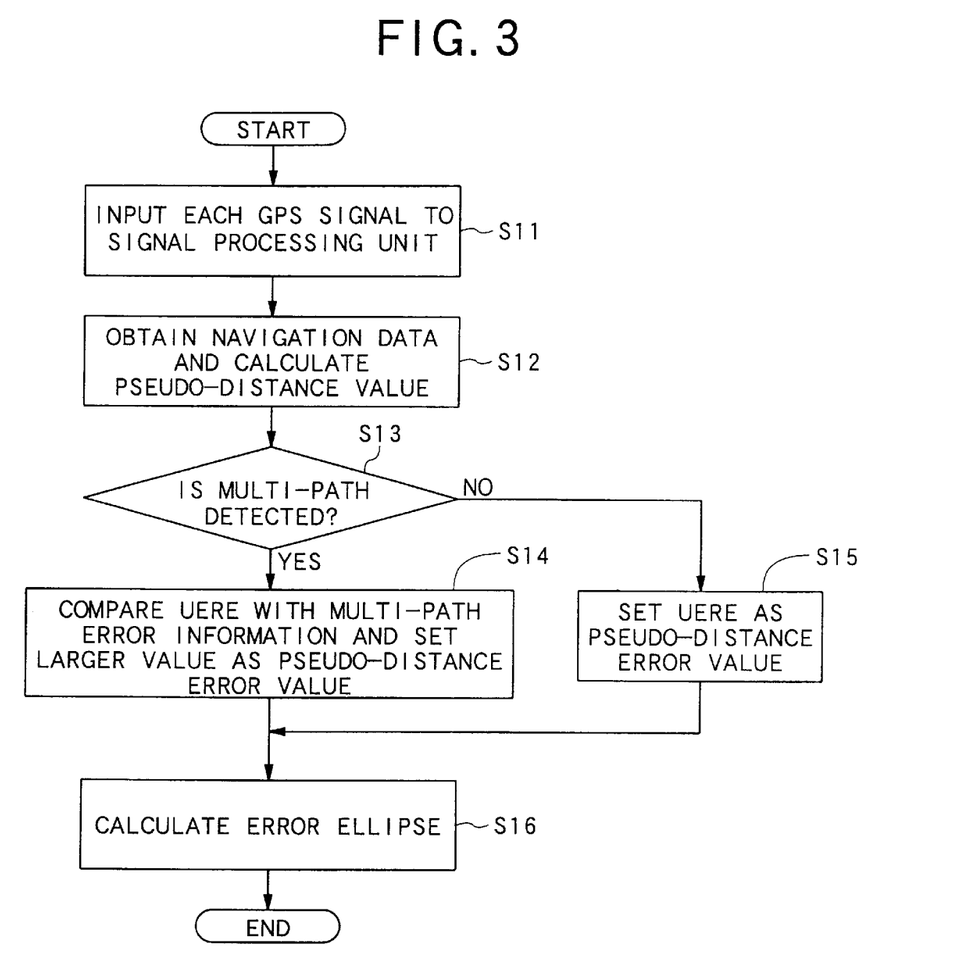
FIG. 3 is a flowchart showing an operation for calculating the error ellipse in the embodiment of the positioning error ellipse setting apparatus, the positioning error ellipse setting method, the positioning error ellipse setting processing program and the navigation apparatus.

It is to be noted that FIG. 3 is a flowchart when calculating the error ellipse by using software.

Further, in this operation, description will be given taking as an instant a method which compares the UERE in the navigation data with the multi-path error information when multi-path is detected and selects the larger value as the pseudo-range error value.

A controlling device first receives reception by a non-illustrated reception unit (step S11).

Subsequently, the controlling device acquires each navigation data for each GPS signal and calculates each pseudo-range (step S12).

Then, judgment is made upon whether multi-path is generated based on each pseudo-range error value (step S13).

At this moment, when multi-path is generated (step S13: Yes), the controlling device compares the UERE in the GPS signal with which multi-path is detected with the multi-path error information, and sets the larger value as an error value of the pseudo-range (step S14).

On the other hand, when multi-path is not detected (step S13: No), the controlling device sets the UERE in the navigation data as an error value of the pseudo-range as it is (step S13).

At last, the controlling device calculates the error ellipse based on the error value of the pseudo-range and terminates this operation (step S16).

Furthermore, the error ellipse calculated by software as described above is outputted to the navigation processing unit 105 together with position data of the vehicle calculated from the GPS signal by the positioning calculation unit 101.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-133056 filed on Apr. 27, 2001 including the specification, claims, drawings and summary is incorporated herein by reference in its entirety.

What is claimed is:

1. A positioning error range setting apparatus comprising:
 a calculating device for calculating a geographical position of a receiver by calculating a pseudo-range between said receiver and each of a plurality of transmitters based on a positioning signal transmitted from each of a plurality of said transmitters;
 a detecting device for detecting whether each said positioning signal is a signal received with occurrence of multi-path; and
 a determining device for determining a positioning error range of said geographical position based on arrangement of a plurality of said transmitters, a positioning error generated when calculating said pseudo-range and a detection result in said detecting device.

2. The positioning error range setting apparatus according to claim 1, wherein said positioning error is acquired based on accuracy information of said pseudo-range that said positioning signal has.

3. The positioning error range setting apparatus according to claim 1, wherein said detecting device detects an error in said pseudo-range of a positioning signal received with occurrence of multi-path and calculates said positioning error based on said error in said pseudo-range.

4. The positioning error range setting apparatus according to claim 1, wherein said error in said pseudo-range of said positioning signal received with occurrence of multi-path is compared with a value obtained by using said accuracy information of said pseudo-range that said positioning signal has, and the larger value in comparison is determined as said positioning error.

5. The positioning error range setting apparatus according to claim 4, wherein said error in said pseudo-range of said positioning signal received with occurrence of multi-path is generated based on a differential value between a predicted value predicted by using an already calculated pseudo-range and said pseudo-range calculated by said calculating device.

6. The positioning error range setting apparatus according to claim 5, wherein, when said differential value is less than a predetermined reference value, said value obtained by using said accuracy information is determined as said positioning error.

7. The positioning error range setting apparatus according to claim 1, wherein said positioning error is calculated based on said error in said pseudo-range of said positioning signal received with occurrence of multi-path and said value obtained by using said accuracy information of said pseudo-range that said positioning signal has.

8. A navigation apparatus comprising:
 a positioning error range setting device comprising: a calculating device for calculating a geographical position of a receiver by calculating a pseudo-range between said receiver and each of a plurality of transmitters based on a positioning signal transmitted from each of a plurality of said transmitters; a detecting device for detecting whether each said positioning signal is a signal received with occurrence of multi-path; and a determining device for determining a positioning error range of said geographical position based on arrangement of a plurality of said transmitters, a positioning error generated when calculating said pseudo-range and a detection result in said detecting device; and
 an evaluating device for evaluating a position of a movable body positioned by dead-reckoning based on a geographical position of said receiver estimated based on said positioning signal and said positioning error range calculated by said positioning error range setting device.

9. A positioning error range setting method comprising:
- a calculation process of calculating a geographical position of a receiver by calculating a pseudo-range between said receiver and each of a plurality of transmitters based on a positioning signal transmitted from each of a plurality of said transmitters;
- a detection process of detecting whether each said positioning signal is a signal received with occurrence of multi-path; and
- a determination process of determining a positioning error range of said geographical position based on arrangement of a plurality of said transmitters, a positioning error generated when calculating said pseudo-range and a detection result in said detection process.

10. The positioning error range setting method according to claim 9, wherein said positioning error is acquired based on accuracy information of said pseudo-range that said positioning signal has.

11. The positioning error range setting method according to claim 9, wherein said detection process detects an error in said pseudo-range of a positioning signal received with occurrence of multi-path, and calculates said positioning error based on said error in said pseudo-range.

12. The positioning error range setting method according to claim 9, said error in said pseudo-range of said positioning signal received with occurrence of multi-path is compared with a value obtained by using said accuracy information of said pseudo-range that said positioning signal has, and the larger value in comparison is determined as said positioning error.

13. The positioning error range setting method according to claim 12, wherein said error in said pseudo-range of said positioning signal received with occurrence of multi-path is generated based on a differential value between a predicted value predicted by using an already calculated pseudo-range and said pseudo-range calculated by said calculating process.

14. The positioning error range setting method according to claim 13, wherein, when said differential value is less than a predetermined reference value, said value obtained by using said accuracy information is determined as said positioning error.

15. The positioning error range setting method according to claim 9, wherein said positioning error is calculated based on said error in said pseudo-range of said positioning signal received with occurrence of multi-path and said value obtained by using said accuracy information of said pseudo-range that said positioning signal has.

16. A positioning error range setting processing program embodied on a computer-readable medium which causes a computer to function as:
- a calculating device for calculating a geographical position of a receiver by calculating a pseudo-range between said receiver and each of a plurality of transmitters based on a positioning signal transmitted from each of a plurality of said transmitters;
- a detecting device for detecting whether each said positioning signal is a signal received with occurrence of multi-path; and
- a determining device for determining a positioning error range of said geographical position based on arrangement of a plurality of said transmitters, a positioning error generated when calculating said pseudo-range and a detection result of said detecting device.

17. The positioning error range setting processing program embodied on a computer-readable medium according to claim 16, wherein said computer is caused to function so as to obtain said positioning error based on accuracy information of said pseudo-range that said positioning signal has.

18. The positioning error range setting processing program according embodied on a computer-readable medium to claim 16, wherein said computer is caused to function as the detecting device for detecting an error in said pseudo-range of said positioning signal received with occurrence of multi-path, and calculating said positioning error based on said error in said pseudo-range.

19. The positioning error range setting processing program embodied on a computer-readable medium according to claim 16, wherein said computer is caused to compare said error in said pseudo-range of said positioning signal received with occurrence of multi-path with a value obtained by using accuracy information of said pseudo-range that said positioning signal has, and determine the larger value in comparison as said positioning error.

20. The positioning error range setting processing program embodied on a computer-readable medium according to claim 19, wherein said computer is caused to generate said error in said pseudo-range of said positioning signal received with occurrence of multi-path based on a differential value between a predicted value predicted by using an already calculated pseudo-range and said pseudo-range calculated by said calculating device.

21. The positioning error range setting processing program embodied on a computer-readable medium according to claim 20, wherein said computer is caused to determine said value obtained by using said accuracy information as said positioning error when said differential value is less than a predetermined reference value.

22. The positioning error range setting processing program embodied on a computer-readable medium according to claim 16, wherein said computer is caused to calculate said positioning error based on said error in said pseudo-range of said positioning signal received with occurrence of multi-path and a value obtained by using said accuracy information of said pseudo-range that said positioning signal has.

* * * * *